Aug. 19, 1941.                J. H. DEPPELER                2,253,366
                         AUTOMATIC WELDING HEAD
                         Filed Dec. 13, 1939
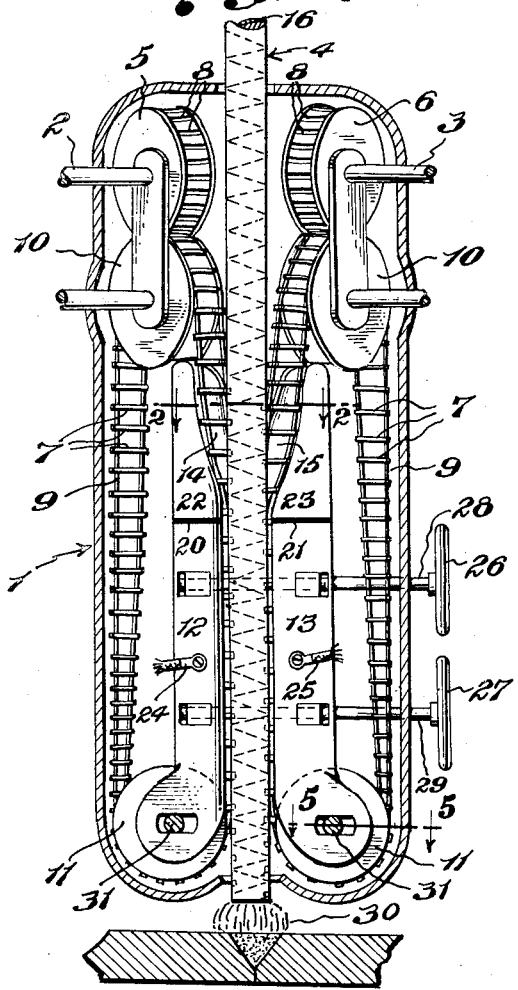
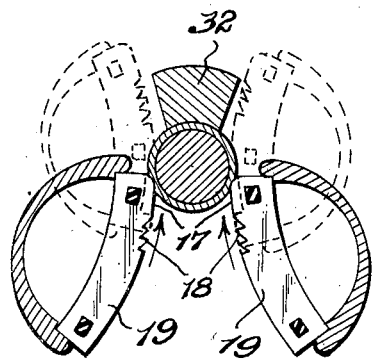
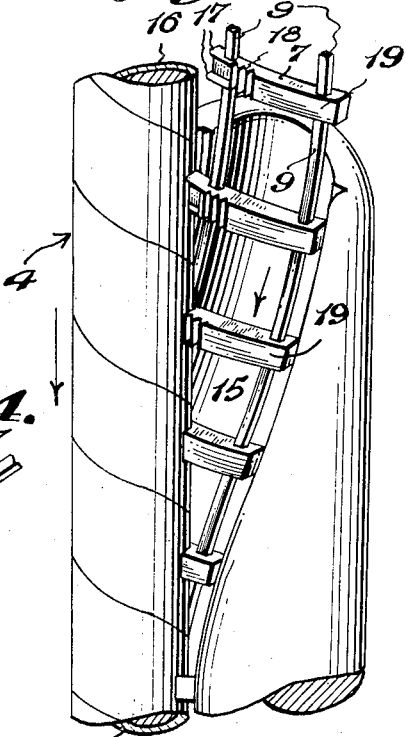
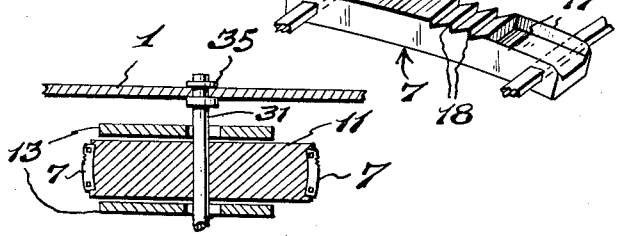
Inventor,
John Howard Deppeler
By: Henry C. Parker Atty.

Patented Aug. 19, 1941

2,253,366

UNITED STATES PATENT OFFICE 2,253,366

AUTOMATIC WELDING HEAD

John Howard Deppeler, Weehawken, N. J., assignor to Metal & Thermit Corporation, New York, N. Y., a corporation of New Jersey Application December 13, 1939, Serial No. 309,075

14 Claims. (Cl. 219—8)

This invention relates to automatic welding head; and it includes a device for feeding welding electrodes provided with flux coatings and for simultaneously supplying current thereto, said device comprising at least one endless belt, a plurality of contact bars mounted on said belt; said contact bars being provided at one end with knives and usually with teeth adapted to produce spaced cuts in the flux coating of an electrode and to remove the coating between said cuts thereby forming grooves in the flux coating, as well as being provided with contact sections adapted to be pressed into said grooves thereby making electrical contact with and supplying current to said electrode; a winding cam surface, for receiving and guiding said endless belt with attached contact bars, adapted to press said contact bars against said electrode while guiding them in such fashion that said knives are first passed through the flux coating forming spaced cuts therein, the teeth are passed through the coating between the cuts to rout out grooves in the coating and then the contact sections are pressed into the grooves making contact with the electrode, and means for driving said endless belt at a rate corresponding to the desired rate of feed of the electrode. The invention also includes the described contact bars as elements, said contact bars comprising a substantially arcuate working surface including a pair of knives adapted to produce spaced cuts in the flux coating of an electrode at least one tooth adjacent said knives adapted to rough out the coating between said cuts thereby forming a groove in the coating and an adjacent contact section adapted to fit into said groove and to make contact with the metal of said electrode, said contact bars being adapted to be pressed against an electrode while being rotated in the plane of their working surfaces; all as more fully set forth and as claimed.

While several automatic welding machines have been developed and successfully used with bare electrode wires, many difficulties have been encountered when it has been attempted to adapt these machines for use with wires provided with the usual flux coatings. These difficulties have been due not only to the fact that flux coatings are usually fragile but also that these coatings must be removed at least in part in order that electrical contact may be made with the metal wire of the electrodes. Several different devices have been suggested for partial removal of the flux coatings and several different methods of making contact with the wire after partial removal of the coatings have been proposed. The flux coatings have been slit lengthwise as well as crosswise of the electrode wires for the introduction of contact elements. However, with the devices proposed heretofore, it has proved impossible to make entirely satisfactory contact with the electrode wires after partial removal of the coatings. This fact has seriously limited the usefulness of the automatic welding method with coated electrodes for the reason that the maximum currents which it has been possible to employ with coated electrodes have not exceeded much more than half the currents employed with bare wire electrodes. These difficulties have been solved by the present invention.

I have developed a new contact bar which serves to produce spaced cuts at intervals in the flux coating, to rout cut the coating material between the spaced cuts and finally to make contact with the wire at the points where the coating is thus removed. The contact bars also support and feed the electrode at the desired rate. These contact bars thus perform several separate functions. This result is accomplished by providing arcuate working surfaces on the contact bars, these working surfaces being formed into spaced knives at one end, into intermediate teeth for routing out the flux coating between the cuts produced by the knives and into contact sections adapted to enter the resulting grooves in the coating and to make contact with the bare wire, the contact bars being slowly rotated during the cutting and routing operations and then being held in contact with the wire while serving to hold and to feed the electrode at the desired rate. By this means the flux coating is removed cleanly from the wire in spaced grooves and the contact bars are pressed against the clean bare wire making excellent contact therewith. The contact bars are preferably mounted on endless belts which are advantageously positioned on opposite sides of the electrode, these endless belts being forced to move along a winding path adjacent the electrode by means of flanged cam surfaces.

My invention can be explained in more detail by reference to the accompanying drawing which shows more or less diagrammatically a welding head which has been found useful in automatic welding operations with coated electrodes. In this showing Fig. 1 is a front elevation of the welding head with parts removed, Fig. 2 is a partial horizontal section along the line 2—2 of Fig. 1, Fig. 3 is a partial view in perspective on an enlarged scale showing how the contact bars are controlled by the cam surface to cut grooves in the electrode coating, Fig. 4 is a perspective view on an enlarged scale of one of my contact bars, while Fig. 5 is a partial section along the line 5—5 of Fig. 1.

In the various figures like parts are designated by like reference numerals. The welding head proper is enclosed in a casing 1. The electrode 4 passes through said casing as shown in Fig. 1. The drive shafts 2 and 3 project through the casing and are driven by means not shown, such as the usual electric motor and gear reduction. The motor, and consequently the electrode, are controlled as to direction and rate of motion, in order to strike and maintain the welding arc, in accordance with a characteristic of the welding circuit, such as arc voltage, for example, by means well known in the art and consequently not illustrated.

Drive wheels 5 and 6 are mounted on the drive shafts 2 and 3 respectively, and are provided with grooves or sockets 8 adapted to engage with the contact bars 7 which are mounted on endless belts each formed of two flexible bands 9 of insulating material. The endless belts pass over upper and lower idler pulleys 10 and 11, respectively, which serve to guide the same over the faces 14 and 15 of cams 12 and 13. These cams are positioned on opposite sides of the electrode and serve to guide the contact bars along a winding path as best seen in Fig. 3. The upper portions 22 and 23 of the cams (Fig. 1) are insulated from the lower portions by the insulating joints 20 and 21. The lower portions of these cams are supplied with electricity by means of the conductors 24 and 25. The cams are adjustable simultaneously towards and away from the electrodes by means of the handwheels 26 and 27 which are mounted on the shafts 28 and 29 provided with both left- and right-hand threads, as will be readily understood from the showing of Fig. 1. The structure of the lower ends of the cams is believed to be clear from the sectional view of Fig. 5. The lower idler pulleys 11 are mounted on shafts 31 which are journaled at 35 in the casing 1.

It is to be understood that the endless belts are driven at a rate corresponding to the desired rate of feed of the electrode, the contact bars serving to hold the electrode in proper position and to drive the same while making electrical contact therewith. The cam faces are shaped in such fashion that the contact bars passing down these surfaces are first contacted with the flux coating 16 of the electrode at their cutting ends; see Figs. 3 and 4. These ends are provided with knives 17 which are preferably rounded slightly, as shown, and are adapted to produce spaced horizontal cuts through the coating, thereby delineating contact grooves in the coating. As the contact bars proceed downwardly along the cam faces they are rotated about an axis substantially coinciding with the axis of their arcuate working surfaces and through an angle of approximately 30°. The initial and final positions of the contact bars with respect to the electrode are shown in Fig. 2. It will be noted from this figure that a post 32 is provided to prevent displacement of the electrode during the operation of the contact bars. The knives are forced through the coating and then the teeth 18 contact the coating in such fashion as to rout out the coating between the spaced cuts.

The nature of the coating on the usual coated electrodes is such that, when routed out in the manner described, the surface of the metal wire of the electrode is left clean and bright, substantially free from dust. The binder which is used to consolidate the powdered ingredients of the coatings tends to hold these ingredients together when the coating is lifted by the teeth 18 whereas, when the coating is milled away or merely cut by a sharp instrument, as in prior art welding heads, the surface of the wire is left dusty and it is substantially impossible to produce a satisfactory contact.

After the coating is routed out by the teeth to form a groove, the contact bars are rotated still further by the cam faces until their contact sections come in contact with the metal of the electrodes. It is now possible to supply current to the electrode through the contact bars. This is accomplished when the contact bars pass across the insulated joints 20 and 21 and come into contact with the non-insulated sections of the cams 12 and 13. From this point on the motion of the contact bars is in a straight line parallel to the axis of the electrode towards the arc 30.

The number of contact bars which must be contacted with the electrode wire at any one time depends, of course, upon the amperage to be employed in the welding operation. The width of the bars also determines the current carrying capacity of these elements. When an electrode is employed which has a spiral winding of asbestos, for example, it is desirable to space the contact bars in such fashion that contact grooves are cut between the windings. This may determine the spacing of the contact bars. I have found that, when my contact bars have a width of $\frac{1}{16}$ inch and when a total of 20 contact bars are engaged with a ¼ inch electrode, it is possible to employ up to about 1000 amperes or 50 ampers per contact in the welding operation. This is substantially twice that employed in prior welding heads employing coated electrodes in which the coating has been removed for the insertion of contact elements. It is sufficient to weld through a three inch plate in a single pass operation. This result is due to the large number of contact bars which contact the electrode simultaneously in my welding head and the fact that these contact bars approach within a very short distance of the arc while in contact with the electrode and before passing around the lower idler pulleys.

While I have described what I consider to be the best embodiments of my welding head, it is evident that various modifications can be made in the various details mentioned without departing from the purview of this invention. If desired a suction tube may be provided in the casing for removal of the coating materials routed out by the contact bars. This may be placed at about the level of the insulated joints 20 and 21, for example. If desired guide posts may be placed on both sides of the electrode, although the single post 32 illustrated in Fig. 2 is usually sufficient to hold the electrode satisfactorily. The bands or belts forming the supports for the contact bars may be made of any flexible, insulating material, such as rubber or fiber, for example. The drive pulleys 5 and 6 can be omitted if desired, the idler pulleys 10 being driven instead. The cams can be constructed of solid material if desired and of somewhat different shape from that shown in the drawing. The electrode may be driven by means supplementing the action of the endless belts if desired and it is possible to employ only one endless belt. The teeth for routing out the flux coating between the spaced cuts may be omitted with some types of coatings since the forward end of the contact section adjacent the knives 17 can be made sufficiently sharp to rout out most types of coatings. It is also possible to employ contact bars having flat working faces by properly shaping the contours of the cam faces to produce a linear movement of the contact bars. Other modifications of my invention which fall within the scope of the following claims will be immediately evident to those skilled in this art.

What I claim is:

1. An automatic welding head for welding with flux-coated metal electrodes comprising at least one endless belt, a plurality of contact bars mounted on said belt provided at one end with cutting sections adapted to form spaced grooves in the coating of such an electrode, thereby exposing the electrode metal, and also provided with adjacent contact sections of such size and shape as to fit into said grooves in contact with said electrode metal, means for driving said endless belt at a rate corresponding to the desired rate of feed of the electrode, means for moving the contact bars longitudinally to force the cutting sections thereof into the electrode coating to form transverse grooves therein and to move the contact sections of said bars into said grooves to make contact with the electrode metal, and means for supplying current to said contact bars while in contact with said electrode.

2. The welding head of claim 1 wherein said contact bars are provided with substantially arcuate working faces and are rotated while in contact with said electrode about an axis, which is substantially parallel to the axis of said electrode and which coincides substantially with the axis of said working faces.

3. The welding head of claim 1 wherein said contact bars are provided with teeth forming part of said cutting section adapted to rout out the coating material to form said grooves.

4. The welding head of claim 1 wherein two endless belts are provided on opposite sides of said electrode and wherein said contact bars are adapted to support as well as to feed said electrode.

5. An automatic welding head for welding with flux-coated metal electrodes comprising two endless belts mounted on upper and lower pulleys on opposite sides of an electrode, a plurality of contact bars mounted on said endless belts provided with cutting sections adapted to form grooves in the coating of said electrode and with contact sections adapted to make electric contact with the metal of said electrode through said grooves, two cams mounted between said pulleys adjacent said electrode, said cams having faces adapted to guide said contact bars into contact with said electrode in such fashion that said cutting sections are first pressed through said coating and then the contact sections are pressed into the resulting grooves, means for driving said endless belts at a rate corresponding to the desired rate of feed of said electrode and means for supplying current to said contact bars when in electric contact with said electrode.

6. The welding head of claim 5 wherein said contact bars are provided with substantially arcuate working surfaces and said cams are adapted to rotate said bars while in contact with said electrode about an axis substantially coinciding with the axis of said arcuate working faces and substantially parallel with the axis of said electrode.

7. An automatic welding head for welding with flux-coated metal electrodes comprising two endless belts mounted on opposite sides of an electrode, a plurality of contact bars mounted on said endless belts provided at one end with knives adapted to produce spaced cuts in said flux-coating, with adjacent teeth adapted to rout out the coating material between said cuts thereby exposing the metal of said electrode and with contact sections adapted to enter the resulting grooves to make contact with said metal, two cams adjustably mounted on opposite sides of said electrode adapted to force said knives transversely through the coating of said electrode thereby producing spaced cuts, to force the teeth of said cutting bar through the coating material between said spaced cuts thereby routing out said material and finally to force the contact sections of said bars into the resulting grooves and into contact with said metal, means for driving said endless belts at a rate corresponding to the desired rate of feed of said electrode and thereby feeding said electrode by means of said belts and means for supplying current to said contact bars while in contact with the metal of said electrode.

8. A contact element for automatic welding heads using flux-coated metal electrodes, comprising a bar provided with a cutting section at one end for forming a groove in the coating of such an electrode and with a contact section adapted to enter said groove and to thereby make contact with the metal of said electrode.

9. The contact element of claim 8 wherein said cutting section and said contact section form a working surface of substantially arcuate shape.

10. A contact element for automatic welding heads using flux-coated metal electrodes, comprising a bar provided with a pair of knives at one end adapted to produce spaced cuts in the coating of such an electrode, with adjacent teeth adapted to rout out the coating material between said spaced cuts and with a contact section adapted to enter the resulting groove in said coating and to make contact with the metal of said electrode.

11. The contact element of claim 10 wherein said knives, said teeth and said contact section form a working surface of substantially arcuate shape.

12. In the process of supplying current to flux-coated electrodes used in automatic welding machines, the steps which comprise producing pairs of closely spaced cuts in the coating of such an electrode, routing out the flux-coating between said cuts, pressing a metal element into the resulting groove and into contact with the metal of said electrode, and passing the welding current through said contact element into said metal wire.

13. In the process of supplying current to flux-coated electrodes used in automatic welding machines equipped with contact bars having a flux cutting section at one end, an adjacent section for routing out the flux material and a contact section, the steps which comprise passing a plurality of said contact bars bodily in the direction of the feed of such an electrode while also moving them in a direction transverse to the electrode, forcing the cutting sections of said bars into the coating of said electrode thereby forming pairs of spaced cuts in the coating, forcing the routing sections between the spaced cuts thereby routing out the coating material between said cuts and forcing the contact sections into the resulting grooves thereby making contact between said contact bars and the metal wire of said electrode, continuing to move the contact bars while in contact with said metal wire in the direction of the welding arc thereby producing feeding of the electrode to the arc, and passing the welding current through said contact bars into said electrode.

14. The process of claim 13 wherein a plurality of contact bars are contacted with said electrode on opposite sides in such fashion as to support as well as to feed said electrode.

JOHN HOWARD DEPPELER.